(12) United States Patent
Alleman

(10) Patent No.: US 9,868,890 B2
(45) Date of Patent: Jan. 16, 2018

(54) METHOD OF INCREASING THE DENSITY OF A WELL TREATMENT BRINE

(71) Applicant: Alleman Consulting, LLC, Pearland, TX (US)

(72) Inventor: David J. Alleman, Pearland, TX (US)

(73) Assignee: ALLEMAN CONSULTING, LLC, Pearland, TX (US)

(*) Notice: Subject to any disclaimer, the term of this patent is extended or adjusted under 35 U.S.C. 154(b) by 31 days.

(21) Appl. No.: 15/069,874

(22) Filed: Mar. 14, 2016

(65) Prior Publication Data

US 2017/0292055 A1   Oct. 12, 2017

(51) Int. Cl.

| C09K 8/06 | (2006.01) |
| C09K 8/68 | (2006.01) |
| C09K 8/74 | (2006.01) |
| C09K 8/42 | (2006.01) |
| C09K 8/40 | (2006.01) |
| C09K 8/52 | (2006.01) |

(52) U.S. Cl.
CPC .................. *C09K 8/06* (2013.01); *C09K 8/40* (2013.01); *C09K 8/42* (2013.01); *C09K 8/52* (2013.01); *C09K 8/68* (2013.01); *C09K 8/74* (2013.01)

(58) Field of Classification Search
None
See application file for complete search history.

(56) References Cited

U.S. PATENT DOCUMENTS

| 6,635,604 | B1 | 10/2003 | Halliday et al. | |
| 2003/0236174 | A1* | 12/2003 | Fu | C09K 8/06 507/200 |
| 2004/0011990 | A1 | 1/2004 | Dunaway et al. | |
| 2006/0027369 | A1* | 2/2006 | Baycroft | C09K 8/52 166/300 |
| 2010/0294498 | A1* | 11/2010 | Svoboda | C09K 8/08 166/305.1 |
| 2011/0245113 | A1 | 10/2011 | Phatak | |
| 2013/0098615 | A1 | 4/2013 | Perez et al. | |

FOREIGN PATENT DOCUMENTS

WO    WO 86/01253 A1    2/1986

OTHER PUBLICATIONS

Notification of Transmittal of the International Search Report and the Written Opinion of the International Searching Authority, or the Declaration, PCT/US2017/021917, dated Jun. 21, 2017.

* cited by examiner

*Primary Examiner* — John J Figueroa

(57) ABSTRACT

A method of increasing the density of a saturated or near saturated salt (initial) brine, such as a monovalent or divalent salt solution, consists of first lowering the true crystallization temperature (TCT) of the saturated or near saturated salt brine to the eutectic point using a glycol and then adding dry salt to the brine of lower TCT to provide a brine of increased density. The TCT may be lowered by the addition of glycol to the saturated or near saturated salt brine. The dry salt is the same salt as the salt of the saturated or near saturated salt brine. The amount of dry salt added to the brine of lower TCT is an amount sufficient to render a saturated or near saturated brine. The density of the resulting brine is higher than the density of the saturated or near saturated salt (initial) brine.

21 Claims, 2 Drawing Sheets

METHOD OF INCREASING THE DENSITY OF A WELL TREATMENT BRINE

FIELD OF THE DISCLOSURE

The disclosure relates to a method of increasing the density of a well treatment brine by reducing the true crystallization temperature (TCT) of the brine with a glycol.

BACKGROUND OF THE DISCLOSURE

Brines are widely used in well treatment operations. For instance, brines are used in well completion as a kill or spike fluid, completion fluid, packer fluid, workover fluid, etc.

Typically, brines are clear and are characterized by a density ranging from about 8.5 pounds per gallon (ppg) to about 20 ppg. Low density brines are usually single salt fluids e.g., NaCl, NaBr, $CaCl_2$ or $CaBr_2$ salt in water, and the density may be as high as 12.7 ppg (NaBr) and 15.3 ppg ($CaBr_2$). Mid-range density fluids, ranging from 11.6 ppg to 15.1 ppg, are typically two salt solutions, such as $CaCl_2$/$CaBr_2$. High density brines, having a density from 14.5 to 19.2 ppg, typically contain zinc or are composed of three salts. Solid-free brines, commonly used in drilling and completion and workover fluids, are typically high density brines. Table I illustrates exemplary brines with their respective density range:

TABLE I

| Aqueous Brine Composition | Brine Density Range, ppg |
|---|---|
| NaBr | 9.0-12.7 |
| $CaCl_2$ | 9.0-11.8 |
| $CaBr_2$ | 10.0-15.3 |
| KCl | 8.5-9.7 |
| NaCl | 8.5-10.0 |
| NaCl/NaBr | 9.0-12.7 |
| $CaCl_2$/$CaBr_2$ | 11.7-15.1 |
| $ZnBr_2$ | 14.5-20.5 |
| $CaBr_2$/$ZnBr_2$ | 14.5-20.5 |
| $ZnBr_2$/$CaBr_2$/$CaCl_2$ | 15.0-19.2 |

Operators typically choose the brine for a treatment operation based on the true vertical depth (TVD), bottom-hole pressure (BHP) and bottomhole temperature (BHT) of the well being treated. Further, since the brine is subjected to heating and cooling during the treatment operation, the temperature profile along the entire path to which the brine is exposed during the treatment operation is also considered.

Typically, the lowest temperature in the path of the brine is not lower than the true crystallization temperature (TCT) of the brine. The TCT (or saturation point) of a brine is the temperature at which a solid phase begins to form, resulting in a mixture of solid particles and solution. These solids may be salt crystals or water crystals, i.e., ice. The TCT is based on the salts dissolved in the brine and is dependent on the weight percent of salt in the brine. TCT typically increases with increasing brine density after the eutectic point, as illustrated in FIG. 1.

The TCT for a calcium bromide brine is provided in Table II.

TABLE II

| $CaBr_2$, % wt. | Density lb/gal | Density g/cc | TCT, ° F. | TCT, ° C. |
|---|---|---|---|---|
| 0 | 8.35 | 1.00 | 32 | 0 |
| 10 | 9.10 | 1.09 | 25 | −4 |
| 20 | 10.01 | 1.20 | 14 | −10 |
| 30 | 11.10 | 1.33 | −4 | −20 |
| 35 | 11.68 | 1.40 | −15 | −26 |
| 40 | 12.36 | 1.48 | −35 | −37 |
| 45 | 13.11 | 1.57 | −62 | −52 |
| 50 | 13.94 | 1.67 | −31 | −35 |
| 51 | 14.11 | 1.69 | −15 | −26 |
| 52 | 14.28 | 1.71 | 1 | −17 |
| 53 | 14.44 | 1.73 | 14 | −10 |

A typical crystallization temperature curve for a brine is the phase diagram illustrated in FIG. 2 for calcium chloride where water has been added to the brine to lower the TCT. The left side of the curve slopes downward with increasing concentration of calcium chloride and represents the solution and ice crystals. It represents the freezing point of the brine, where ice crystals begin to form. The right side of the curve represents the solution and salt crystals. It represents the phase boundary of the brine, below which the salt crystals begin to form. The eutectic point, minimum point where the two curves intersect, indicates the chemical composition and temperature at the lowest melting point of the components of the brine. It is the point at which the minimum crystallization temperature can be realized, i.e., where the solution is in equilibrium with two solid phases: ice and calcium chloride.

FIG. 3 compares the crystallization curve (water based) for a calcium bromide brine with the curve for the calcium chloride brine. FIG. 4 compares the crystallization curve for a potassium chloride brine and a sodium chloride brine with calcium chloride. The TCT for each is measured under atmospheric pressure. In each of these figures, solid salts form once the temperature of the brine is cooled below its TCT. Typically, the TCT is the determining factor when selecting a clear brine fluid for a completion/workover application.

Lowering of the TCT past its eutectic point results in the salting out of crystals, typically small angular particles, that seed crystal formation. Once formed, such masses of salt crystals are difficult to remove and can block any system using the brine. Thus, the formation of solids puts increased demands on pumping equipment in light of the increased resistance to fluid flow. In addition, the loss of soluble salts by settling or filtration drastically reduces the density of the completion fluid. Loss of density of the clear brine can result in an underbalanced situation.

Completion fluids are typically high density brines. Generally, a zinc bromide ($ZnBr_2$) brine is used when a brine is required to have a density of about 14.5 ppg or above. Zinc bromide, blends of zinc bromide and calcium bromide and blends of zinc bromide, calcium bromide and calcium chloride have been preferred completion fluids in the Gulf of Mexico in wells that require density ranges 14.5-19.2 ppg.

At the conclusion of any completion or workover project, a substantial volume of contaminated or unneeded completion/workover fluid typically remains. Such fluids may be contaminated with water, drilling mud, formation materials, rust, scale, pipe dope, viscosifiers, fluid-loss-control pills, etc. Before bringing the well into production, removal of the brine is typically required. If it is deemed that the fluids have future use potential, they may be reclaimed and re-used. Zinc based brines have been proven to be difficult to reclaim and typically have little practical or economic value. Environmental regulations for conducting disposal activities and reporting and reacting to spills are heightened when a zinc containing brine is used.

Alternatives for high density brines, especially brines not containing zinc, are therefore desired.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

The disclosure relates to a method of increasing the density of a saturated or near saturated salt brine (initial brine) wherein the TCT of the saturated or near saturated salt brine is first lowered to its eutectic point or near eutectic point by the addition of a glycol. Dry salt is then added to the brine of lower TCT to provide a brine of increased density. The dry salt is the same salt as that salt of the saturated or near saturated salt brine. The amount of dry salt added to the brine of lower TCT is an amount sufficient to render a saturated or near saturated brine having a density higher than the density of the initial brine.

In another embodiment, the disclosure relates to a method of increasing the density of a saturated or near saturated salt brine. In the first step of the method, the density of the saturated or near saturated salt brine is reduced by the addition of a glycol. The amount of glycol added to the saturated or near saturated salt brine is that sufficient to reduce the true crystallization temperature (TCT) of the saturated or near saturated salt brine to its eutectic point or near eutectic point. The density of the brine of reduced TCT is then increased by adding to it a dry salt. The dry salt is the same salt as the salt of the saturated or near saturated salt brine. The amount of salt added to the brine of reduced TCT is that sufficient to increase the density of the brine of reduced TCT to a density which is from about 8 to about 30 percent higher than the density of the saturated or near saturated salt brine.

The method(s) disclosed herein have particular applicability to the treatment of salt containing brines, such as brines of sodium bromide, calcium chloride, calcium bromide, potassium chloride, sodium chloride, mixtures of sodium chloride and sodium bromide and mixtures of calcium chloride and calcium bromide.

In an embodiment of the disclosure, a method of increasing the density of a salt containing brine of sodium bromide, calcium chloride, calcium bromide or a mixture of calcium chloride and calcium bromide is provided. In this embodiment, the density of the salt containing brine is reduced 6 to 14% by adding to the salt containing brine a glycol. A dry salt corresponding to the salt of the salt containing brine is then added to the brine of reduced density until the resulting brine is saturated or near saturated with the salt. The density of the resulting brine is greater than the density of the salt containing brine.

As an example of the disclosure, the density of a 14.2 pound per gallon (ppg) calcium bromide brine may be reduced to 13.0 ppg by the addition of glycol to the brine. The addition of dry calcium bromide to the calcium bromide brine of reduced density provides a calcium bromide brine solution having a density of 16.5 ppg.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
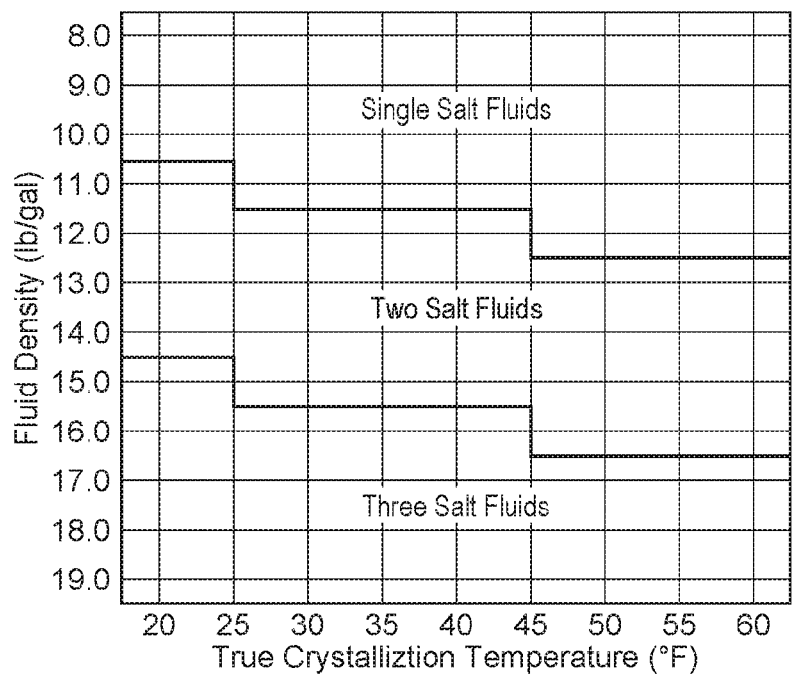
FIG. 1 represents the relationship of TCT and clear brine density.

Characteristics and advantages of the present disclosure described above and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The disclosure relates to a method of increasing the density of a brine. The method uses a glycol but does not require any other organic material or salt other than the dry salt added to the brine of reduced density as disclosed herein.

In a first step the TCT as well as the density of a saturated or near saturated salt brine is decreased. The TCT of the saturated or near saturated brine may be lowered to its eutectic point or near eutectic point by the addition of a glycol to the saturated or near saturated salt brine. The lowering of the TCT of the saturated or near saturated salt to its eutectic point or near eutectic point brine allows for greater amount of salt to be solubilized into the solution to render a brine having a density higher than the density of the saturated or near saturated salt brine. For purposes herein, the term "near eutectic point" shall refer to the temperature which is about 10%, preferably 5%, warmer than the eutectic point. Thus, where the eutectic point is −120° F., the near eutectic point may be −108° F.

For purposes herein, the phrase "saturated or near saturated salt brine", shall refer to the initial brine, i.e., the brine before the reduction in density with the glycol. The term "brine of reduced TCT" or "brine of reduced density" shall refer to the resulting brine after the addition of the glycol. The phrase "brine of increased density" shall refer to the resulting brine which results from the addition of the dry salt to the brine of reduced TCT or the brine of reduced density. It is understood that the process disclosed herein is directed to the treatment of a single brine solution. The phrases "brine of reduced TCT", "brine of reduced density" and "brine of increased density" are only used to more clearly denote the physical and chemical state of the brine at the various stages of the disclosed process.

As used herein, the term "saturated brine" refers to a brine having the maximum level of salt at which no further salt can be added to the brine without the salt falling out of solution. A "near saturated brine" shall refer to a brine which is at least 90% (but not 100%) saturated. In a preferred embodiment, a near saturated brine is at least 92% to 99% saturated. For example a calcium bromide brine of 14.2 ppg contains a near saturated amount of calcium bromide at 15.3 ppg. Table III is exemplary of brines at saturated and near saturation levels of salt:

TABLE III

| | Salt concentration @100% saturation | Salt concentration @Near Saturation |
|---|---|---|
| NaCl | 26% | 25.58% |
| NaBr | 40% | 39.2% |
| KCl | 24% | 23.5% |
| $CaCl_2$ | 40% | 39.2% |
| $CaBr_2$ | 57% | 55.9% |

The brine which is subjected to the addition of glycol is either saturated or at near saturation. Preferably the brine is at near saturation.

The density of the saturated or near saturated salt brine is lowered by the addition of the glycol. The glycol may include ethylene glycol, propylene glycol and glycerol.

The addition of the glycol also lowers the true crystallization temperature (TCT) of the brine. For purposes herein, references to TCT are based on measurements which can be attained using API Recommended Practice 13J, Second Edition, March 1996. Commercial kits are available for determining TCT of oil field brines, including those from the Fann Instrument Company, Houston, Tex.

Figure 2:
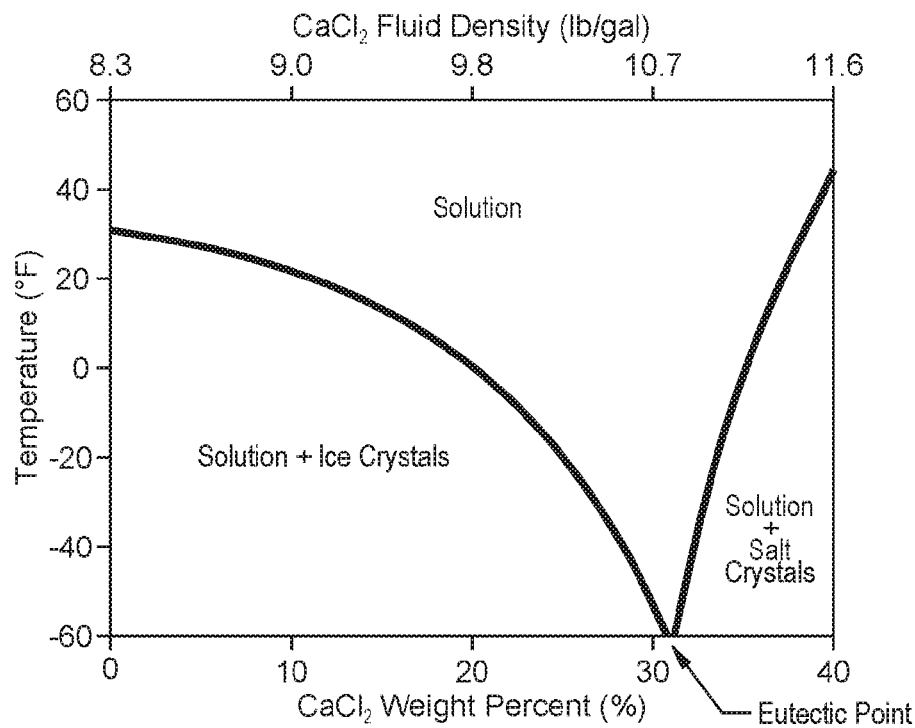
FIG. 2 is the phase diagram of calcium bromide brine in water.

FIG. 2 shows the lowest TCT of a calcium bromide brine to be approximately −80° F. at a calcium bromide wt % of approximately 47% upon the addition of water. The addition of glycol to the same (initial) brine lowers the TCT (and thus density) of the brine to a much greater extent. Thus, where glycol has been added to the calcium bromide brine (in place of water), the eutectic point of the resulting brine is much lower than the eutectic point illustrated in FIG. 2 upon the addition of water. Since the eutectic point of the brine of lower density is much lower than the eutectic point of the brine treated with water, a greater amount of salt may be added to the brine of lower density. The density of the resulting brine (the brine of higher density) is thus greater than the brine of the saturated or near saturated (the initial) brine. The amount of glycol added to the brine is typically the amount which is sufficient for the eutectic point of the saturated or near saturated salt brine to be reduced to its lowest value.

FIG. 2 shows changes in the TCT of a near saturated $CaBr_2$ brine upon the addition of water; the brine having a density of 14.1 ppg and contains 51 weight percent of salt. The TCT of $CaBr_2$ brine at 51 wt. % is shown to be −15° F. FIG. 2 shows the lowest TCT of $CaBr_2$ to be −62° F. when the concentration of $CaBr_2$ in the brine is 45 wt. %. In contrast, when glycol (instead of water) is added to the $CaBr_2$ brine of 14.1 ppg, the TCT is lowered to a greater extent and the eutectic point of the resulting brine is much lower than −62° F. Preferably, the amount of glycol added to the saturated or near saturated salt brine is that which will be sufficient for the brine of reduced density to be at the near the eutectic point (i.e., not exceeding the TCT).

Typically, the amount of glycol added to the saturated or near saturated salt brine is an amount sufficient to lower the density of the saturated or near saturated salt brine by from about 6 to about 14%, typically from about 8 to about 14%.

Dry salt is then added to the brine of reduced density. The dry salt is the same salt as the salt of the saturated or near saturated salt brine. Thus, in a preferred embodiment, the salt of the saturated or near saturated salt brine is sodium bromide and the dry salt added to the brine of reduced TCT is sodium bromide; the salt of the saturated or near saturated salt brine is calcium chloride and the dry salt added to the brine of reduced TCT is calcium chloride; the salt of the saturated or near saturated salt brine is calcium bromide and the dry salt added to the brine of reduced TCT is calcium bromide; the salt of the saturated or near saturated salt brine is potassium chloride and the dry salt added to the brine of reduced TCT is potassium chloride; the salt of the saturated or near saturated salt brine is sodium chloride and the dry salt added to the brine of reduced TCT is sodium chloride; or the salt of the saturated or near saturated salt brine is a mixture of calcium chloride and calcium bromide the dry salt added to the brine of reduced TCT is a mixture of calcium chloride and calcium bromide.

The amount of salt added to the brine of reduced density is an amount sufficient to increase the density of the brine of reduced density. The amount of salt which is added is typically the amount necessary to render a brine of higher density which is saturated or near saturated with the salt. Thus, the weight of the resulting brine, i.e., the brine of increased density, is greater than the weight of the saturated or near saturated salt brine (initial brine). In other words, the addition of the glycol to the initial brine, by lowering the density of the initial brine, enables greater amounts of salt to be solubilized by the brine of lower density and thus provide a brine of higher density than the initial brine.

In an embodiment, the TCT of the saturated or near saturated brine of higher density is about 30 to about 65° F.

Typically, the amount of dry salt added to the brine of reduced density (or reduced TCT) is an amount sufficient to increase the density of the brine of reduced TCT to a density which is from about 8 to about 30%, typically from about 8 to about 20%, more typically from about 8 to about 14%, higher than the density of the saturated or near saturated salt brine (initial brine). Generally, the greater the amount of glycol added to the initial brine, the lower the TCT of the modified brine solution and thus the greater amount of salt which can be solubilized into the salt solution.

The disclosure provides a brine of increased density when used with single salt brines, such as brines of sodium bromide, calcium chloride, calcium bromide, potassium chloride, sodium chloride, potassium chloride; brines composed of two salts, such as mixtures of potassium chloride and calcium chloride, mixtures of sodium chloride and sodium bromide, mixtures of calcium chloride and calcium bromide, as well as brines composed of three or more salts. While the method of the disclosure is applicable as well to zinc containing brines, the focus of the disclosure is the use of the process to provide alternatives to zinc containing brines. Thus, for instance, a brine within the same density range as a zinc containing brine may be attained using the process disclosed herein. In other words, single salt brines and mixtures of salts may be used in place of zinc containing brines because the density of such brines has been increased to be within the same range as zinc containing brines. In a preferred embodiment, the saturated or near saturated salt brine is sodium bromide, calcium bromide, calcium chloride or a mixture of calcium chloride and calcium bromide.

Where the brines are composed of two or more salts, the weight ratio of the salts would be dependent on the desired density of the brine. Generally, where the initial brine is a salt mixture, the weight ratio of the salts in the dry salt is the same ratio as the salts in the salt mixture of the initial brine. Thus, for instance, where the salt of the saturated or near saturated salt brine is a mixture of calcium chloride and calcium bromide, the weight ratio of calcium chloride to calcium bromide in the dry salt added to the brine of reduced density is the same weight ratio of calcium chloride to calcium bromide in the saturated or near saturated salt brine (initial brine).

the brine of increased density may be between from 10 to 12% higher than the density of the saturated or near saturated salt brine. In another embodiment, where the salt of the saturated or near saturated salt brine is calcium chloride, the density of the brine of increased density may be between from 6 to 12% higher than the density of the saturated or near saturated salt brine. Where the salt of the saturated or near saturated salt brine is calcium bromide, the density of the brine of increased density may be between from 8 to 18%, typically 10 to 14%, higher than the density of the saturated or near saturated salt brine. Where the salt of the saturated or near saturated salt brine is a mixture of calcium chloride and calcium bromide, the density of the brine of increased density may be between from 8 to 10% higher than the density of the saturated salt or near saturated salt brine. Where the salt of the saturated or near saturated salt brine is a mixture of potassium chloride or sodium chloride, the density of the brine of increased density may be between from 8 to 16%, more typically 12 to 16%, higher than the density of the saturated salt or near saturated salt brine.

Table IV exemplifies the process of the disclosure for sodium bromide, calcium chloride, calcium bromide, potassium chloride, sodium chloride and mixture of calcium chloride and calcium bromide brines which are near saturated. The Table provides the initial density, the TCT of the initial brine, the amount of glycol added to the initial brine to render the brine of lower density, the density of the brine of lower density after the addition of the glycol, the TCT of the brine after the addition of the glycol and the final density of the brine after the addition of the salt to the brine of reduced density. The final TCT of the brine of increased density is between 30 and 65° F.

TABLE IV

| Brine Composition | Initial Density | TCT | Type of Glycol | Amount of Glycol | Reduced Density | New TCT | Final Density |
|---|---|---|---|---|---|---|---|
| NaBr | 12.5 ppg | 37 F. | Glycerol | 33-45% | 11.4-11.7 | <−30 | 13.5-14.5 |
| CaCl$_2$ | 11.6 ppg | 38 F. | Glycerol | 59-60% | 10.8 | <−30 | 12.5-14.0 |
| CaBr$_2$ | 14.2 ppg | 0 F. | Glycerol | 26-38% | 12.5-13.0 | <−30 | 16.0-16.8 |
| CaBr$_2$ | 15.1 ppg | 63 F. | Glycerol | 26-38% | 13.0-13.5 | <−30 | 16.0-16.8 |
| CaCl$_2$/CaBr$_2$ | 15.1 ppg | 63 F. | Glycerol | 26-38% | 13.0-13.5 | <−30 | 16.0-16.8 |
| KCL | 9.7 ppg | 54 F. | EG | 61% | 9.4 | <−30 | 10.5-11.5 |
| NaCl | 10.0 ppg | 25 F. | EG | 23-58% | 9.5-9.8 | <−30 | 11.0-12.0 |

As an illustration of the disclosure, a saturated or near saturated brine has a salt content which is a 0.2 ppg near saturation. The density of the brine may be reduced by the addition of glycerol ranging from 20-50%. Dry salt may then be added to the brine having the reduced density in order to increase the concentration of the salt in the brine by about 1.2 ppg to about 3.0 ppg above the density of the (initial) saturated or near saturated brine.

Thus, where the salt of the saturated or near saturated salt brine is calcium bromide, the amount of glycol added to the saturated or near saturated salt brine which is sufficient to lower the density of the saturated or near saturated salt brine to from about 8.5 to about 14% and the amount of calcium bromide added to the brine of reduced TCT is an amount sufficient to increase the density of the brine of reduced TCT to a density which is from about 8 to about 14 percent higher than the density of the saturated or near saturated salt brine. Preferably, the amount of dry calcium bromide added to the brine of reduced TCT should not exceed 300 g.

In another embodiment, where the salt of the saturated or near saturated salt brine is sodium bromide, the density of The method disclosed is of particular applicability when used to increase the density of stock solutions of brine. Stock solutions refer to the density of a brine when it is stored under normal conditions and which is provided to the industry. For instance, the method may be used to increase the density of a stock 11.6 ppg calcium chloride brine to 13.0; the density of a stock 14.2 calcium bromide brine to 16.5 as well as the density of a stock 12.5 ppg sodium bromide brine to 14.0.

Brines of higher density can be used in any field of oil/gas technology that requires use of a brine, including as a gelled acid, an acid diverter, a high density fracturing fluid, a high pressure high temperature fluid loss control, in a completion fluid, workover fluid, a drill-in fluid or low polymer drill-in fluid, a packer fluid, an insulated packer fluid, a polymer slurry, a weighted displacement spacer, a weighted cementing cleaning spacer, a gravel pack carrier fluid, a solids free drill-in fluid, a drilling mud, a slurry fluid for solids material, for example fumed silica, silica powder, any inorganic solid material, a coil tubing fluid for clean out, etc. The high density brine fluid is particularly useful in increasing the solubility of dry salt in completion/workover fluids.

Figure 3:
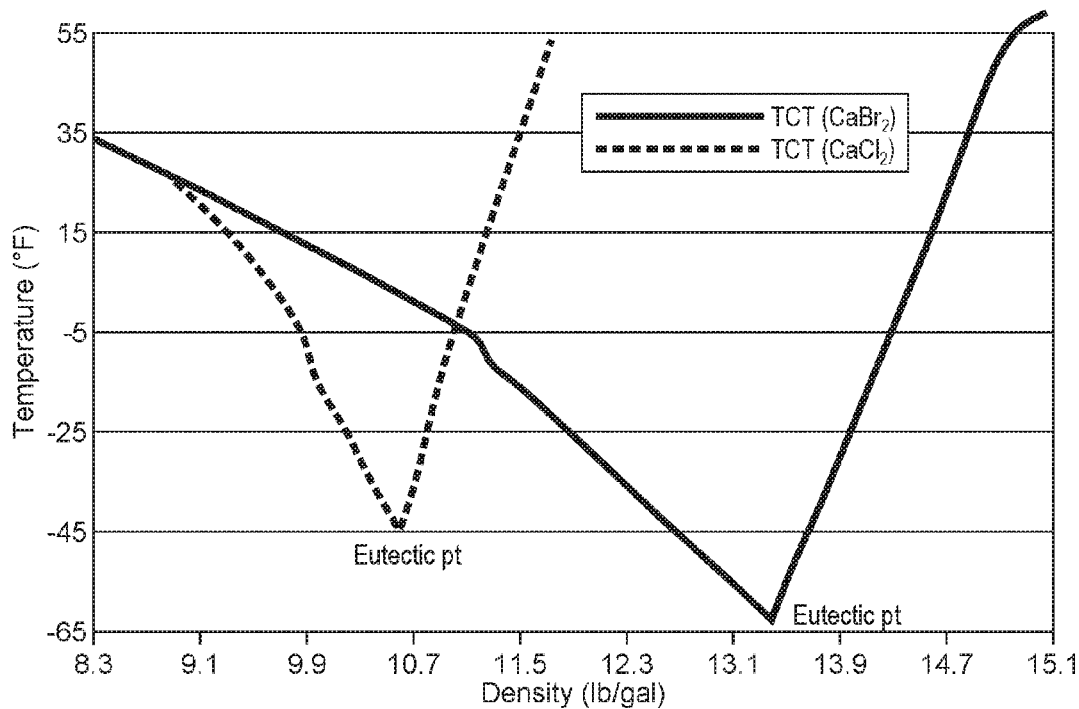
FIG. 3 compares the phase diagram of calcium bromide in water with the phase diagram of calcium chloride brine in water.
Figure 4:
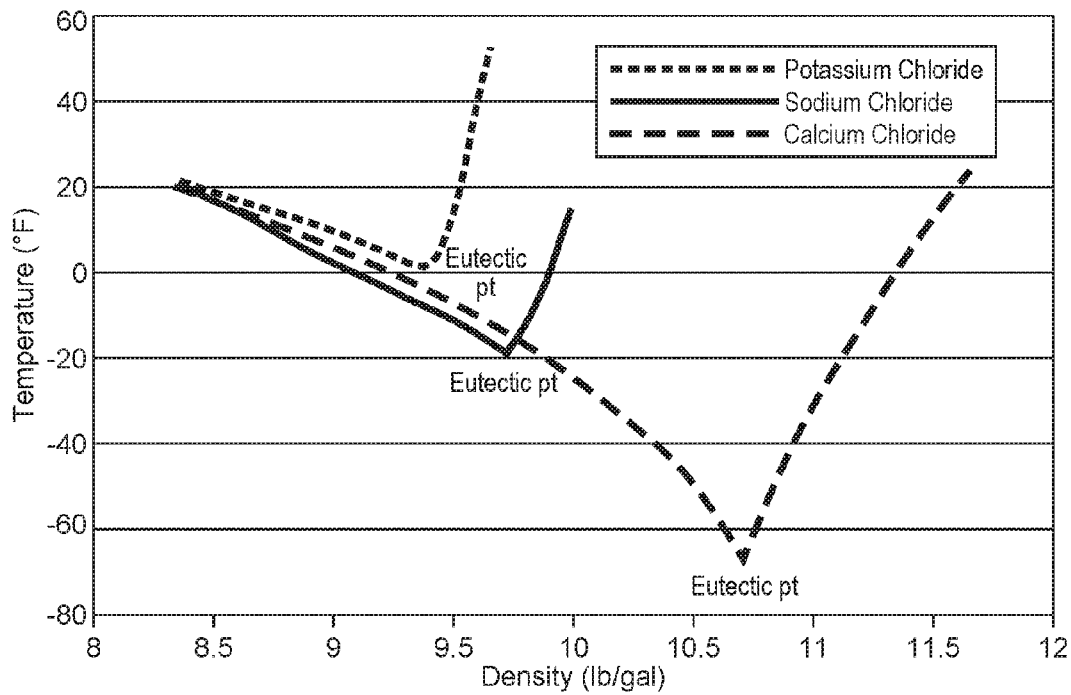
FIG. 4 compares the phase diagram of calcium bromide in water with the phase diagrams of potassium chloride and sodium chloride in water.

While the brine of modified density as disclosed herein is typically produced under atmospheric conditions, operators typically consider the pressurized crystallization temperature (PCT) of the brine in their selection. At in-situ downhole conditions, elevated pressure with low temperature may cause brines to crystallize at a temperature higher than the expected TCT. Typically, if the density of the brine is on the curve of FIGS. 2-4 to the right of the ice salt eutectic point, an increase in pressure will raise the TCT of the brine solution.

EXAMPLES

All percentages set forth in the Examples are given in terms of weight units except as may otherwise be indicated.

Example 1

This Example illustrates a method of increasing the density of a 14.2 ppg calcium bromide solution to 16.5 ppg using dry calcium bromide salt. Glycerol is first introduced to the 14.2 ppg calcium bromide brine to reduce the density of the brine to 13.0 ppg. The solution is stirred for five minutes and then filtered. Then incrementally, dry calcium bromide is added to the brine of 13.0 ppg to render a brine having a density of 16.5 ppg. The calcium bromide solution is preferably filtered every 100 grams to remove any contaminates created from the dry calcium bromide salt. To make 350 ml of brine having a density of 16.5 ppg, the amount of 14.2 ppg $CaBr_2$ was 147.3 ml, the amount of glycerol was 130.4 ml and the amount of dry calcium bromide was 247.6 g.

What is claimed is:

1. A method of increasing the density of a saturated or near saturated salt brine comprising:
   (a) reducing the density of the saturated or near saturated salt brine by adding a glycol thereto, wherein the amount of glycol added to the saturated or near saturated salt brine is an amount sufficient to reduce the true crystallization temperature (TCT) of the saturated or near saturated salt brine to its eutectic point or near eutectic point;
   (b) increasing the density of the brine of reduced TCT by adding a dry salt thereto, wherein the dry salt is the same salt as the salt of the saturated or near saturated salt brine and further wherein the amount of salt added to the brine of reduced TCT is an amount sufficient to increase the density of the brine of reduced TCT to a density which is from about 8 to about 30 percent higher than the density of the saturated or near saturated salt brine.

2. The method of claim 1, wherein the amount of glycol added to the saturated or near saturated salt brine is an amount sufficient to lower the density of the saturated or near saturated salt brine by from about 6 to about 14%.

3. The method of claim 2, wherein the salt of the saturated or near saturated salt brine is sodium bromide, calcium bromide, calcium chloride or a mixture of calcium chloride and calcium bromide.

4. The method of claim 1, wherein the TCT of the produced brine of step (b) is between from about 30 to about 65° F.

5. The method of claim 1, wherein the amount of salt added to the brine of reduced TCT is an amount sufficient to increase the density of the brine of reduced TCT to a density which is from about 8 to about 14% higher than the density of the saturated or near saturated salt brine.

6. The method of claim 1, wherein either:
   (a) the salt of the saturated or near saturated salt brine is sodium bromide and the dry salt added to the brine of reduced TCT is sodium bromide;
   (b) the salt of the saturated or near saturated salt brine is calcium chloride and the dry salt added to the brine of reduced TCT is calcium chloride;
   (c) the salt of the saturated or near saturated salt brine is calcium bromide and the dry salt added to the brine of reduced TCT is calcium bromide;
   (d) the salt of the saturated or near saturated salt brine is potassium chloride and the dry salt added to the brine of reduced TCT is potassium chloride;
   (e) the salt of the saturated or near saturated salt brine is sodium chloride and the dry salt added to the brine of reduced TCT is sodium chloride; or
   (f) the salt of the saturated or near saturated salt brine is a mixture of calcium chloride and calcium bromide the dry salt added to the brine of reduced TCT is a mixture of calcium chloride and calcium bromide.

7. The method of claim 6, wherein the salt of the saturated or near saturated salt brine is a mixture of calcium chloride and calcium bromide and further wherein the weight ratio of calcium chloride to calcium bromide in the dry salt is the same weight of ratio of calcium chloride to calcium bromide in the saturated or near saturated salt brine.

8. The method of claim 3, wherein the salt of the saturated or near saturated salt brine is calcium bromide and wherein the amount of glycol added to the saturated or near saturated salt brine is an amount sufficient to lower the density of the saturated or near saturated salt brine by from about 8.5 to about 14% and further wherein the amount of calcium bromide added to the brine of reduced TCT is an amount sufficient to increase the density of the brine of reduced TCT to a density which is from about 8 to about 14 percent higher than the density of the saturated or near saturated salt brine.

9. The method of claim 1, wherein the glycol is ethylene glycol, propylene glycol or glycerol.

10. The method of claim 1, wherein the brine is composed of two or more salts.

11. A method of increasing the density of a saturated or near saturated salt brine, the method comprising:
    (a) lowering the true crystallization temperature (TCT) of the saturated or near saturated salt brine to its eutectic point by the addition of a glycol;
    (b) adding dry salt to the brine of lower TCT to provide a brine of increased density, wherein the dry salt is the same salt as that salt of the saturated or near saturated salt brine and further wherein the amount of dry salt added to the brine of lower TCT is an amount sufficient to render a saturated or near saturated brine
    wherein the density of the brine of step (b) is higher than the density of the saturated or near saturated salt brine.

12. The method of claim 11, wherein the glycol is ethylene glycol, propylene glycol or glycerol.

13. The method of claim 11, wherein the TCT of the brine produced in step (b) is between from about 30 to about 65° F.

14. The method of claim 11, wherein dry salt is selected from the group consisting of sodium bromide, calcium chloride, calcium bromide, potassium chloride and sodium chloride and mixtures thereof.

15. The method of claim 14, wherein the dry salt is calcium bromide.

16. The method of claim 14, wherein the salt of the saturated or near saturated salt brine is sodium bromide and further wherein the density of the brine of step (b) is between from 10 to 12% higher than the density of the saturated or near saturated salt brine.

17. The method of claim 14, wherein the salt of the saturated or near saturated salt brine is calcium chloride and further wherein the density of the brine of step (b) is between from 6 to 10% higher than the density of the saturated or near saturated salt brine.

18. The method of claim 14, wherein the salt of the saturated or near saturated salt brine is calcium bromide and further wherein the density of the brine of step (b) is between from 8 to 18% higher than the density of the saturated or near saturated salt brine.

19. The method of claim 14, wherein the salt of the saturated or near saturated salt brine is a mixture of calcium chloride and calcium bromide and further wherein the density of the brine of step (b) is between from 8 to 10% higher than the density of the saturated salt or near saturated salt brine.

20. The method of claim 11, wherein the brine is composed of two or more salts.

21. The method of claim 11, wherein the amount of glycol added to the saturated or near saturated salt brine is an amount sufficient to lower the density of the saturated or near saturated salt brine by from about 6 to about 14%.

\* \* \* \* \*